(12) United States Patent
Kobori

(10) Patent No.: US 9,704,082 B2
(45) Date of Patent: Jul. 11, 2017

(54) MARKER GENERATION APPARATUS, MARKER RECOGNITION APPARATUS, MARKER GENERATION METHOD, MARKER RECOGNITION METHOD, AND PROGRAM

(71) Applicant: TOYOTA JIDOSHA KABUSHIKI KAISHA, Toyota-shi, Aichi-ken (JP)

(72) Inventor: Norimasa Kobori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/944,967

(22) Filed: Nov. 18, 2015

(65) Prior Publication Data
US 2016/0155037 A1 Jun. 2, 2016

(30) Foreign Application Priority Data
Dec. 2, 2014 (JP) .................................. 2014-244313

(51) Int. Cl.
*G06K 19/06* (2006.01)
*G06K 7/12* (2006.01)

(52) U.S. Cl.
CPC ......... *G06K 19/06056* (2013.01); *G06K 7/12* (2013.01); *G06K 19/0614* (2013.01); *G06K 19/06037* (2013.01); *G06K 19/06103* (2013.01); *G06K 19/06168* (2013.01)

(58) Field of Classification Search
USPC .......... 235/461.01, 449, 462.01–462.09, 494
See application file for complete search history.

(56) References Cited

U.S. PATENT DOCUMENTS

| | | | | |
|---|---|---|---|---|
| 8,950,685 B1* | 2/2015 | Lin | ........................ | G06K 5/02 235/494 |
| 2007/0051813 A1* | 3/2007 | Kiuchi | ................. | G06K 7/1417 235/462.1 |
| 2008/0191035 A1* | 8/2008 | Cheon | .................... | G06K 1/123 235/494 |
| 2008/0298688 A1* | 12/2008 | Cheong | .................... | G06K 7/14 382/224 |
| 2009/0230193 A1* | 9/2009 | Al-Hussein | ........ | G06K 7/10722 235/462.11 |

(Continued)

FOREIGN PATENT DOCUMENTS

| | | |
|---|---|---|
| JP | 2007-248198 A | 9/2007 |
| JP | 2008-287652 A | 11/2008 |
| JP | 2009-295145 A | 12/2009 |

*Primary Examiner* — Tuyen K Vo
(74) *Attorney, Agent, or Firm* — Oliff PLC

(57) ABSTRACT

A marker generation apparatus includes code acquisition means for acquiring N-bit code information (N is a natural number no less than two) for superimposing the code information on a marker defined in a plurality of areas, multiplication means for multiplying each bit value of the code information acquired by the code acquisition means by an M-sequence matrix respectively, color information calculation means for calculating color information by adding up multiplication results obtained by the multiplication means, the color information being used for performing a color arrangement for each area of the marker, and color arrangement means for performing a color arrangement for each area of the marker based on the color information calculated by the color information calculation means.

12 Claims, 18 Drawing Sheets

(56) References Cited

U.S. PATENT DOCUMENTS

2012/0145779 A1* 6/2012 Bietenbeck ...... G06K 19/06037
    235/375
2014/0144996 A1* 5/2014 Friedman ......... G06K 19/06037
    235/494
2015/0339838 A1* 11/2015 Friedman ......... G06K 19/06103
    345/641

* cited by examiner

MARKER GENERATION APPARATUS, MARKER RECOGNITION APPARATUS, MARKER GENERATION METHOD, MARKER RECOGNITION METHOD, AND PROGRAM

INCORPORATION BY REFERENCE

This application is based upon and claims the benefit of priority from Japanese patent application No. 2014-244313, filed on Dec. 2, 2014, the disclosure of which is incorporated herein in its entirety by reference.

BACKGROUND OF THE INVENTION

1. Field of the Invention

The present invention relates to a marker generation apparatus, a marker recognition apparatus, a marker generation method, a marker recognition method, and a program for generating or recognizing a marker attached or marked on an item.

2. Description of Related Art

A 2D (two-dimensional) code reader that reads a 2D code such as a QR code (Registered Trademark) has been known (see, for example, Japanese Unexamined Patent Application Publication No. 2009-295145).

It should be noted that a marker such as a 2D code contains code information. Further, each pixel in a marker image expresses 1-bit value of code information contained in the marker image. Therefore, for example, when there is a missing (or defective) pixel in the marker image due to noises such as out-of-focus blurring, there is a possibility that the accuracy of recognition of the code information of the marker image may be lowered.

The present invention has been made to solve the above-described problem and an object thereof is to provide a marker generation apparatus, a marker recognition apparatus, a marker generation method, a marker recognition method, and a program capable of recognizing code information of a marker with high accuracy.

SUMMARY OF THE INVENTION

To achieve the above-described object, a first exemplary aspect of the present invention is a marker generation apparatus including: code acquisition means for acquiring N-bit code information (N is a natural number no less than two) for superimposing the code information on a marker defined in a plurality of areas; multiplication means for multiplying each bit value of the code information acquired by the code acquisition means by an M-sequence matrix respectively; color information calculation means for calculating color information by adding up multiplication results obtained by the multiplication means, the color information being used for performing a color arrangement for each area of the marker; and color arrangement means for performing a color arrangement for each area of the marker based on the color information calculated by the color information calculation means.

In this aspect, the color information may be information indicating a ratio among a plurality of predetermined colors for arranging each of the plurality of predetermined colors for each area of the marker, the plurality of predetermined colors being defined in advance.

In this aspect, the color arrangement means may perform the color arrangement by assigning color information calculated by the color information calculation means to each area of the marker, respectively, and using the assigned information as a size ratio among the predetermined colors when the predetermined color is arranged for each area of the marker.

In this aspect, the marker may have a concentric circular shape and each area of the marker may be defined by a concentric circular boundary. In this aspect, the marker generation apparatus may further include learning means for learning the M-sequence matrix by an ICA (Independent Component Analysis) by using a marker image containing a noise, and the multiplication means may multiply each bit value of the code information acquired by the code acquisition means by an M-sequence matrix, respectively, learned by the learning means. To achieve the above-described object, another exemplary aspect of the present invention may be a marker recognition apparatus that recognizes code information of a marker generated by the above-described marker generation apparatus.

In this aspect, the marker recognition apparatus may include: image acquisition means for acquiring an image of the marker; recognition means for recognizing each area of the image of the marker acquired by image acquisition means; color information calculation means for calculating the color information based on each area recognized by the recognition means; and code information calculation means for calculating the code information by multiplying color information calculated by the color information calculation means by a transposed matrix of the M-sequence matrix.

In this aspect, the marker recognition apparatus may further include learning means for learning the transposed matrix by an ICA (Independent Component Analysis) by using a marker image containing a noise, and the code information calculation means may calculate the code information by multiplying the color information calculated by the color information calculation means by the transposed matrix learned by the learning means.

To achieve the above-described object, another exemplary aspect of the present invention is a marker generation method including: a step of acquiring N-bit code information (N is a natural number no less than two) for superimposing the code information on a marker defined in a plurality of areas; a step of multiplying each bit value of the acquired code information by an M-sequence matrix respectively; a step of calculating color information by adding up multiplication results obtained by the multiplication, the color information being used for performing a color arrangement for each area of the marker; and a step of performing a color arrangement for each area of the marker based on the calculated color information.

To achieve the above-described object, another exemplary aspect of the present invention may be a marker recognition method for recognizing code information of a marker generated by the above-described marker generation method.

In this aspect, the marker recognition method may include: a step of acquiring an image of the marker; a step of recognizing each area of the image of the acquired marker; a step of calculating the color information based on each of the recognized areas; and a step of calculating the code information by multiplying the calculated color information by a transposed matrix of the M-sequence matrix.

To achieve the above-described object, another exemplary aspect of the present invention may be a program for causing a computer to execute: a process of acquiring N-bit code information (N is a natural number no less than two) for superimposing the code information on a marker defined in a plurality of areas; a process of multiplying each bit value of the acquired code information by an M-sequence matrix respectively; a process of calculating color information by adding up multiplication results obtained by the multiplication, the color information being used for performing a color arrangement for each area of the marker; and a process of performing a color arrangement for each area of the marker based on the calculated color information.

According to the present invention, it is possible to provide a marker generation apparatus, a marker recognition apparatus, a marker generation method, a marker recognition method, and a program capable of recognizing code information of a marker with high accuracy.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

First Exemplary Embodiment

Exemplary embodiments according to the present invention are explained hereinafter with reference to the drawings.

For example, a marker is attached or marked on an item that its robot operates. The robot can recognize the position, the posture, the distance, and so on of the item by recognizing the position of the marker. Further, when the marker contains code information, the robot can recognize the code information at the same time that it recognizes the position and size of the marker. A marker recognition apparatus according to a first exemplary embodiment of the present invention generates code information that is contained (i.e., incorporated) in a marker like the one described above.

It should be noted that in the past, for example, each pixel of a marker image expresses 1-bit value. Therefore, there is a problem that when there is a missing pixel (or defective pixel) (hereinafter simply referred to as a "defective pixel") in a marker image due to noises such as out-of-focus blurring, the accuracy of the code information of the marker image could be lowered.

In contrast to this, the marker recognition apparatus according to the first exemplary embodiment expresses each bit value of code information by a feature pattern of the whole marker image. Therefore, even when a defective pixel or the like occurs in the marker image, the marker recognition apparatus can lower the effect of the defective pixel. Therefore, the code information of the marker can be recognized with higher accuracy.

Figure 1:
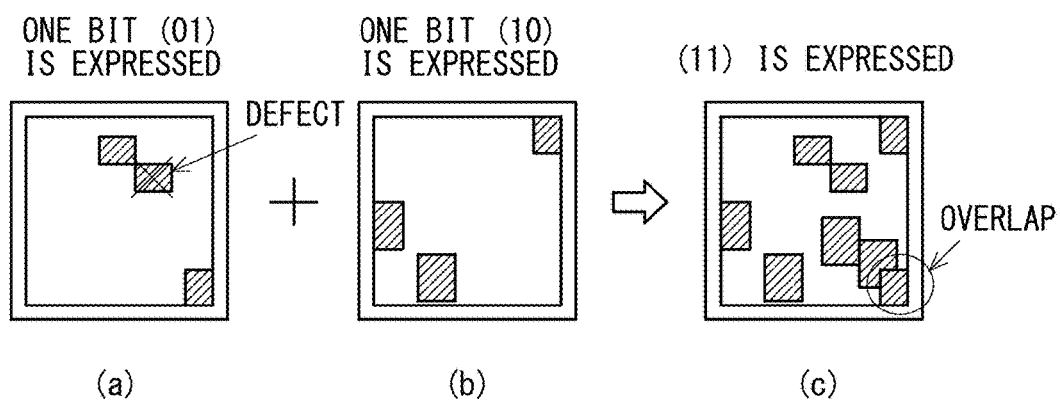
FIG. 1 shows figures expressing each bit value by feature patterns of the whole marker images.

For example, as shown in FIG. 1, the marker recognition apparatus generates a marker image (c) expressing a 2-bit value (11) by superimposing a marker image (b) expressing a 1-bit value (10) on another marker image (c) expressing a 1-bit value (01). In this case, even if a defective pixel occurs in the marker image (a), it is possible to generate a marker image that is not affected by this defective pixel by restoring it by using the other information.

Figure 2:
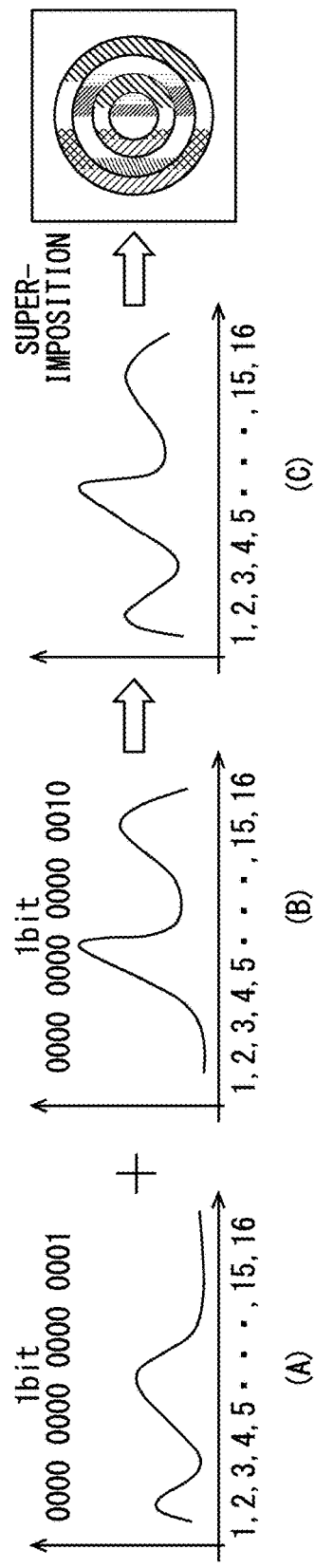
FIG. 2 shows figures expressing one bit values by a plurality of N-dimensional waveforms.

More specifically, as shown in FIG. 2, the two 1-bit values are expressed by a plurality of (i.e., two) N-dimensional (e.g., 16-dimensional) waveforms ((A) and (B)), respectively. Information for expressing the marker (e.g., a color histogram (color component ratio) as shown in FIG. 2(C)) is generated by superimposing these waveforms on each other. Then, a color arrangement is performed for the marker based on the generated information.

Figure 3:
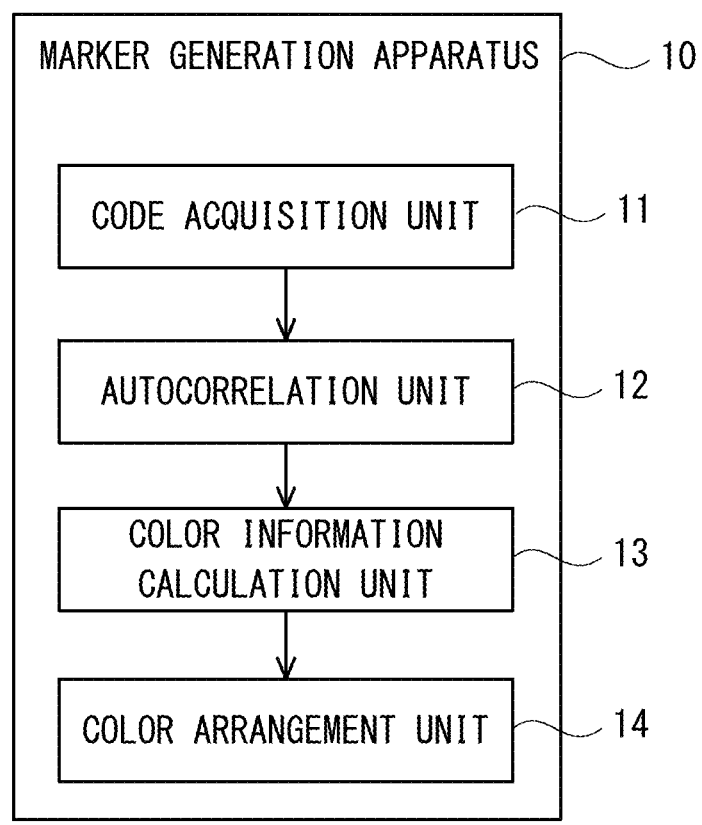
FIG. 3 is a block diagram showing a general system configuration of a marker generation apparatus according to a first exemplary embodiment of the present invention.

FIG. 3 is a block diagram showing a general system configuration of the marker generation apparatus according to the first exemplary embodiment. The marker generation apparatus 10 according to the first exemplary embodiment includes a code acquisition unit 11 that acquires N-bit code information (N is a natural number no less than two), an autocorrelation unit 12 that multiplies each bit value of the acquired code information by a matrix of a M-sequence (hereinafter called an "M-sequence matrix") respectively, a color information calculation unit 13 that calculates color frequency information used for performing a color arrangement for each area of the marker, and a color arrangement unit 14 that performs a color arrangement for each area of the marker.

Each of the marker generation apparatus 10 and a marker recognition apparatus 20 (which will described later) is constructed, for example, by hardware by mainly using a microcomputer including a CPU (Central Processing Unit) that performs arithmetic processing and so on, a memory including a ROM (Read Only Memory) and/or a RAM (Random Access Memory) in which an operation program, a control program, and so on executed by the CPU are stored, an interface unit (I/F) that externally receives/outputs signals, and so on. The CPU, the memory, and the interface unit are connected to each other through a data bus and the like.

The code acquisition unit 11 is a specific example of the code acquisition means. The code acquisition unit 11 acquires N-bit code information (e.g., information composed of zero and one) for superimposing it on a marker defined in a plurality of areas. The code acquisition unit 11 outputs the acquired code information to the autocorrelation unit 12.

The autocorrelation unit 12 is a specific example of the multiplication means. The autocorrelation unit 12 multiplies each bit value of the code information acquired by the code acquisition unit 11 by an M-sequence matrix respectively. For example, the autocorrelation unit 12 multiplies each bit value of the code information output from the code acquisition unit 11 by the M-sequence matrix respectively by using the below-shown Expression (1).

$$X=WS \qquad (1)$$

Note that in the above-shown expression, S is code information output from the code acquisition unit 11 and is, for example, zero or one. W is a generator matrix of an M-sequence (Maximum-length shift-register sequence). This generator matrix W is composed of, for example, an M-sequence of a spread code. This M-sequence has a characteristic by which the autocorrelation is high and the cross-correlation is low. Therefore, it is possible to improve the noise tolerance by multiplying each bit value of the code information by the M-sequence matrix respectively and thereby increase the autocorrelation for each bit value of the code information. That is, each bit value of the code information is expressed by a feature pattern of the whole marker image.

Here, the generator matrix W is expressed by an orthogonal M-sequence P in order to maximize the inter-code distance. The M-sequence uses four-dimensional primitive polynomial ($a^4+a+1$) and 15($=2^4-1$) code sequences of $\{1,-1\}$ are obtained. The orthogonal M-sequence is obtained by using $\{-1\}$ as the value for i=16 for $P_{*i}$ and $P_{i*}$. Note that the generator matrix W can be formed by an arbitrary M-sequence having a characteristic by which the autocorrelation is high and the cross-correlation is low. The autocorrelation unit 12 outputs the multiplication result obtained by the above-described multiplication to the color information calculation unit 13.

The color information calculation unit 13 is a specific example of the color information calculation means. The color information calculation unit 13 calculates color frequency information (an example of color information), which is used for performing a color arrangement for each area of the marker, by adding up the multiplication results obtained by the autocorrelation unit 12. This color frequency information is, for example, information indicating a ratio among a plurality of predetermined colors, which are defined in advance, for arranging each of the plurality of predetermined colors for each area of the marker.

The color information calculation unit 13 calculates, for example, color frequency information X of the eventual marker by adding up color frequency information $X_i$ of each of 16-dimensional bits by using the below-shown Expression (2).

[Expression 1]

$$X=\Sigma_i^n X_i = \Sigma_i^n W_i S_i \qquad (2)$$

The color information calculation unit 13 outputs the calculated color frequency information X to the color arrangement unit 14.

The color arrangement unit 14 is a specific example of the color arrangement means. The color arrangement unit 14 performs a color arrangement for each area of the marker based on the color frequency information X calculated by the color information calculation unit 13.

Note that, for example, since a robot or the like makes complicated movements and observes a marker of an item from various distances and from various directions, how the marker is observed widely changes. Therefore, there is a need for code information that is independent of the position of the marker (i.e., irrespective of how the marker is observed depending on the direction and the scale) on which the code information is superimposed.

To cope with this, the marker according to the first exemplary embodiment has, for example, a layered (ring-shaped) circular shape (hereinafter called a "concentric circular shape"). Each area in the concentric circular shape is defined by a concentric circular boundary. The color arrangement unit 14 determines a color component ratio (color arrangement) in each area (each layer) of the concentric circular shape.

Note that the circular shape is robust against rotations and inclinations. Therefore, the marker is formed in a circular shape and a color arrangement is performed for each area having a circular shape according to the color frequency information indicating the code information. As a result, it is possible to provide code information that is independent of the position of the marker (i.e., irrespective of how the marker is observed depending on the direction and the scale) on which the code information is superimposed.

Figure 4:
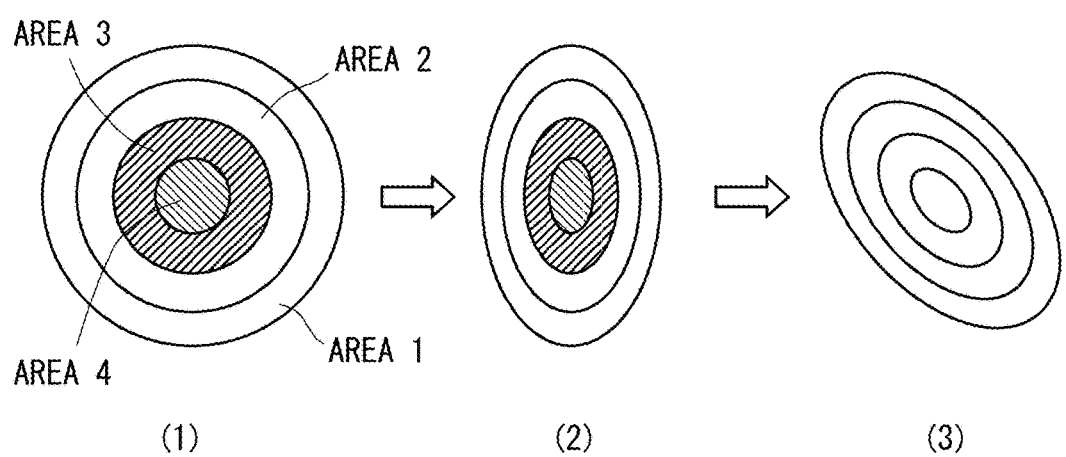
FIG. 4 shows an example of a marker having a concentric circular shape.

For example, when a concentric circular shape (radius:1, size $\pi*1*1$) viewed from the front shown in FIG. 4(1) is horizontally inclined, it becomes a concentric circular shape (major axis a, minor axis b, size $\pi*a*b$) shown in FIG. 4(2). Further, when this concentric circular shape is rotated by 45 degrees, it becomes a concentric circular shape (major axis a, minor axis b, size $\pi*a*b$) shown in FIG. 4(3). As described above, when the concentric circular shape is inclined, the orthogonal projection becomes an elliptic shape and its size ratio becomes constant times (in the example shown in FIGS. 4(2) and 4(3), ab times). Therefore, even if the concentric circular shape of the marker is inclined or enlarged/contracted, the size of each area of the marker also becomes larger/smaller by the constant times. Therefore, its color component ratio is kept unchanged.

Therefore, the marker according to the first exemplary embodiment has a concentric circular shape and the code information is expressed by a color component ratio in each area of the code information. This makes it possible to encode code information that is independent of the position of the marker in the marker. For example, it is possible to express code information that is hardly affected by environment light and the spectroscopic characteristic of the marker. In particular, when code information is expressed by a component ratio between "red" and "blue", which are distant from each other in the wavelength range, the effect of the out-of-focus blurring can be reduced even further.

In the concentric circular shape, four areas 1 to 4, for example, are formed from the outer side of the marker toward the center thereof (FIG. 4(1)). However, the arrangement of the concentric circular shape is not limited to such an example. The number of areas formed in the concentric circular shape may be arbitrarily determined. Further, the concentric circular shape may be defined by lengthwise lines. The boundaries (including lengthwise lines) between the areas 1 to 4 may be formed, for example, by a green (G) component.

For example, for each of the areas 1 to 3, five states including (R) Red component (an R-component is no less than a threshold $R_h$ and a B-component is less than a threshold $B_h$), (B) Blue component (the R-component is less than the threshold $R_h$ and the B-component is no less than the threshold $B_h$), (R/B) both Read component and Blue component (the R-component is no less than the threshold $R_h$ and the B-component is no less than the threshold $B_h$), (N) neither of Red component and Blue component (the R-component is less than a threshold $R_L$ and the B-component is less than a threshold $B_L$), and (I) indefinite (other than the above-described four states) are defined as predetermined colors. For the area 4, four states including the above-described (R), (B), (R/B), and (N) states are defined. Note that (I) indefinite is defined to obtain the consistency of the output ratio among the areas. The above-described thresholds are defined, for example, as follows: $R_h=120$, $B_h=117$, and $R_L=B_L=50$.

The color arrangement unit 14 assigns each of the color frequency information X output from the color information calculation unit 13 to each area of the concentric circular shape. Then, the color arrangement unit 14 uses the assigned information as a size ratio among predetermined colors when the predetermined color is arranged for each area of the marker. For example, the color arrangement unit 14 assigns the color frequency information X of 16-dimensional data output from the color information calculation unit 13 to each of the areas 1 to 4 having the concentric circular shape. The 16-dimensional color frequency information X expresses, in each of the areas 1 to 4, a distribution ratio (or arrangement ratio) among (R), (B), (R/B), (N) and (I) when (R), (B), (R/B), (N) and (I) are distributed (or arranged).

For example, the color arrangement unit 14 assigns first to fourth dimension data to the area 1, assigns fifth to eighth dimension data to the area 2, assigns ninth to twelfth dimension data to the area 3, and assigns 13th to 16th dimension data to the area 4. Note that the method for assigning the color frequency information to each area is not limited to the above-described method.

A method for performing a color arrangement for the area 3 is explained hereinafter. Here, the ninth to 13th dimension data are expressed as follows: (ninth dimension data):(tenth dimension data):(eleventh dimension data):(twelfth dimension data):(13th dimension data)=a:b:c:d:e. The total number of pixels in the area 3 is represented by "P3". In this case, the number of (R) pixels distributed to the area 3 is expressed as "P3\*a/(a+b+c+d+e)". The number of (B) pixels is expressed as "P3\*b/(a+b+c+d+e)". The number of (R/B) pixels is expressed as "P3\*c/(a+b+c+d+e)". The number of (N) pixels is expressed as "P3\*d/(a+b+c+d+e)". Further, the number of (I) pixels is expressed as "P3\*e/(a+b+c+d+e)".

For the area 4, the 13th to 16th dimension data are expressed as follows: (13th dimension data):(14th dimension data):(15th dimension data):(16th dimension data)=f:g:h:i. The total number of pixels in the area 3 is represented by "P4". In this case, the number of (R) pixels distributed to the area 4 is expressed as "P4\*f/(f+g+h+i)". The number of (B) pixels is expressed as "P4\*g/(f+g+h+i)". The number of (R/B) pixels is expressed as "P4\*h/(f+g+h+i)". The number of (N) pixels is expressed as "P4\*i/(f+g+h+i)".

Figure 5:
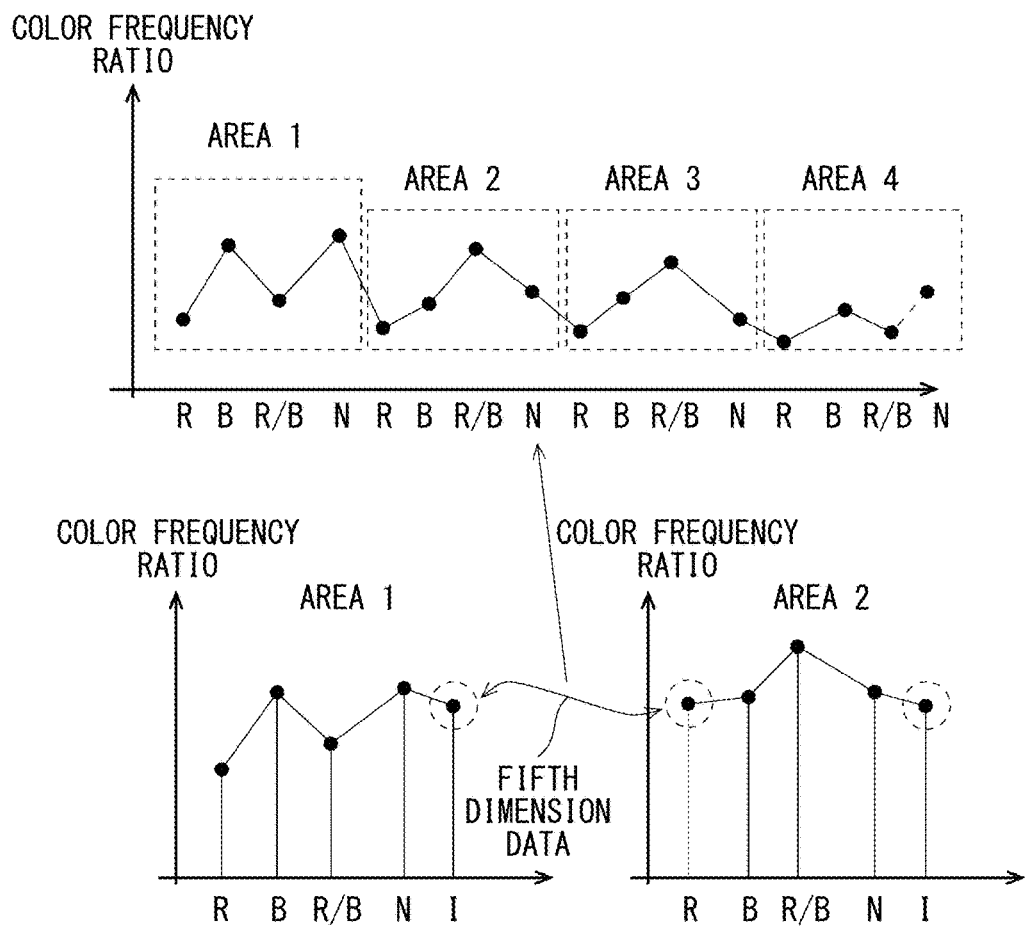
FIG. 5 shows an example of a color histogram showing a color frequency ratio among (R), (B), (R/B), (N) and (I)

Note that as shown above, only the (13th dimension data) is used for both of the areas 3 and 4. Similarly, the fifth dimension data is used for both of the areas 1 and 2, and the ninth dimension data is used for both of the areas 2 and 3. In this way, the differences between the numbers of pixels in the areas 1 to 4 can be absorbed, thus making it possible to achieve the consistency even when the distribution ratio in each of the areas 1 to 4 is observed in the whole 16-dimensional data. FIG. 5 is a color histogram showing a color frequency ratio (pixel number ratio) of (R), (B), (R/B), (N) and (I) when (R), (B), (R/B), (N) and (I) are distributed in each of the areas 1 to 4 based on the 16-dimensional color frequency information X. For example, as shown in FIG. 5, the fifth dimension data is used for both of the areas 1 and 2. Further, it is defined so that the color frequency ratio of (I) in the area 1 is equal to that of (R) in the area 2.

Lastly, the color arrangement unit 14 generates a marker according to the above-described numbers of pixels of (R), (B), (R/B), (N) and (I) set for each of the areas 1 to 4.

Figure 6:
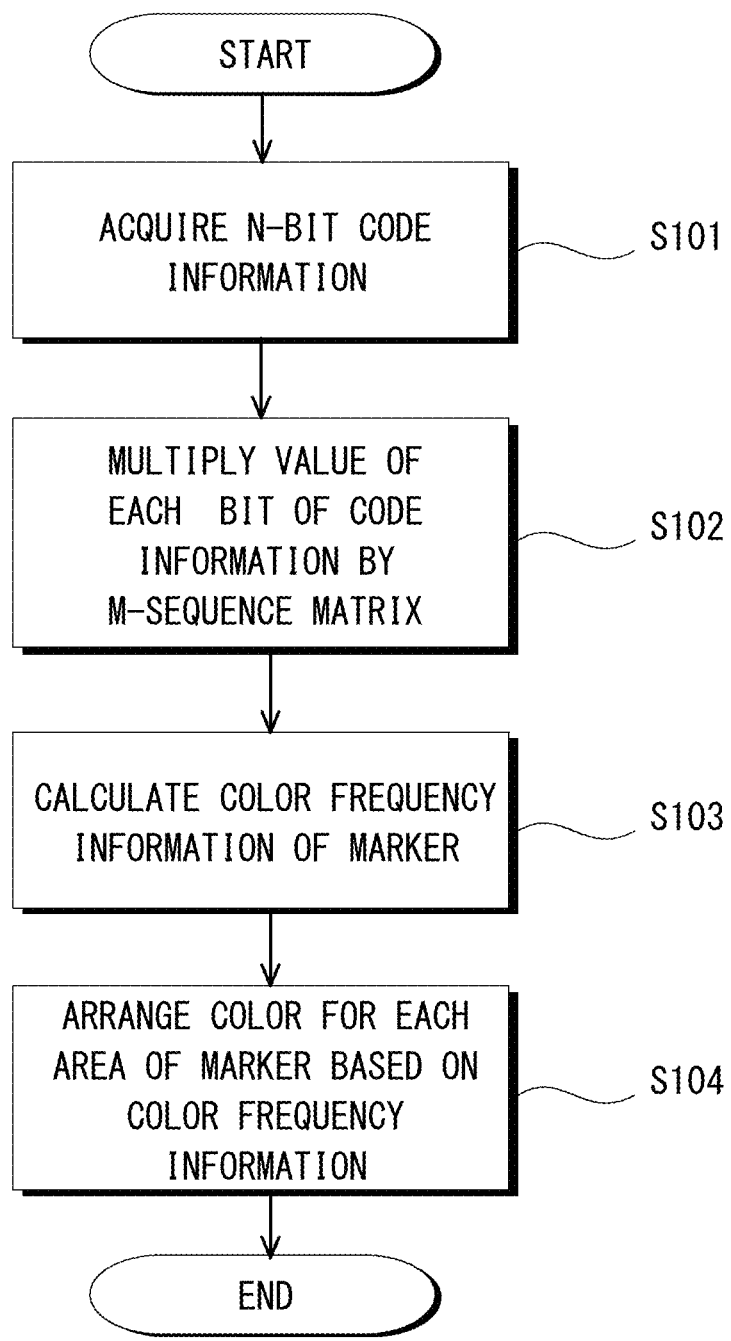
FIG. 6 is a flowchart showing a marker generation method according to the first exemplary embodiment of the present invention.

FIG. 6 is a flowchart showing a marker generation method according to the first exemplary embodiment. The code acquisition unit 11 of the marker generation apparatus 10 acquires N-bit code information and outputs the acquired code information to the autocorrelation unit 12 (step S101). The autocorrelation unit 12 multiplies each bit value of the code information output from the code acquisition unit 11 by an M-sequence matrix respectively by using the above-shown Expression (1) and outputs the multiplication result obtained by the multiplication to the color information calculation unit 13 (step S102).

The color information calculation unit 13 calculates color frequency information X of the eventual marker by adding up the multiplication result (color frequency information X) output from the autocorrelation unit 12 by using the above-shown Expression (2) and outputs the calculated color frequency information X to the color arrangement unit 14 (step S103). The color arrangement unit 14 performs a color arrangement for each circular area of the marker based on the color frequency information calculated by the color information calculation unit 13 (step S104).

As stated above, in the first exemplary embodiment: N-bit code information is acquired; each bit value of the code information is multiplied by an M-sequence matrix respectively; the multiplication results (color frequency information) are added up; color frequency information X of the marker is calculated; and a color arrangement is performed for each circular area of the marker based on the calculated color frequency information. In this way, each bit of the code information is expressed by using the entire area of the marker image, thus making it possible to reduce the decrease in the accuracy of the code information due to noises such as out-of-focus blurring. As a result, the code information of the marker can be recognized with high accuracy.

Figure 7:
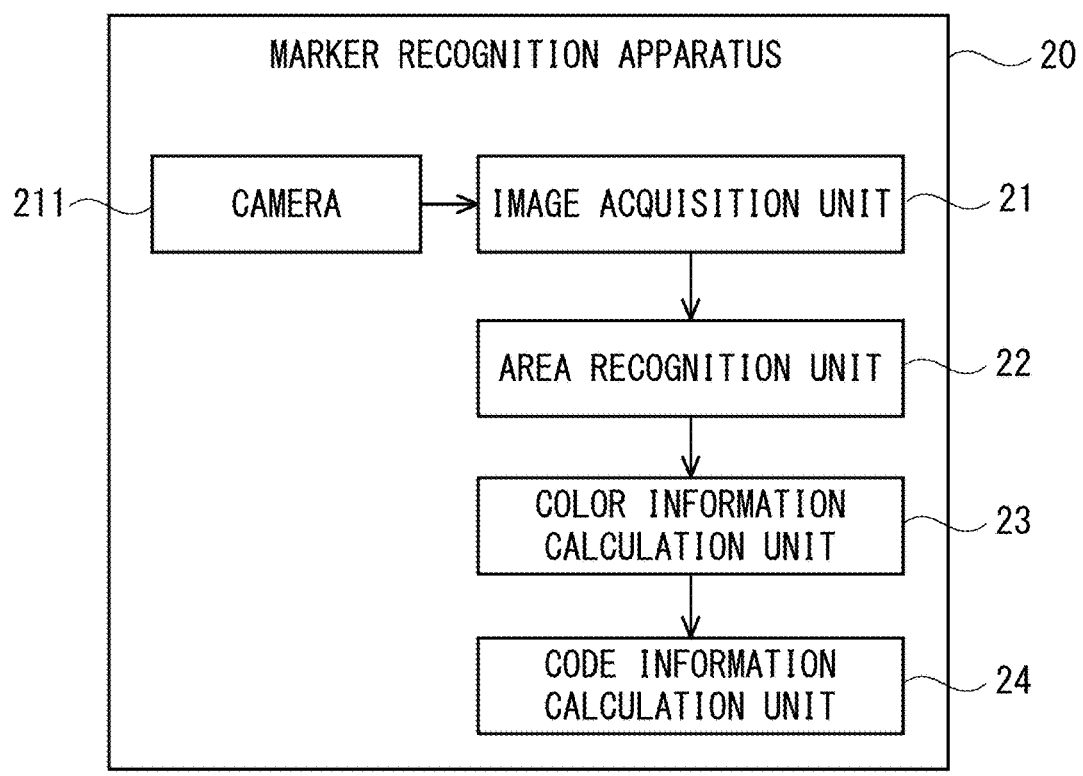
FIG. 7 is a block diagram showing a general system configuration of a marker recognition apparatus according to the first exemplary embodiment of the present invention.

FIG. 7 is a block diagram showing a general system configuration of a marker recognition apparatus according to the first exemplary embodiment. The marker recognition apparatus 20 according to the first exemplary embodiment recognizes code information contained in a marker generated by the above-described marker generation apparatus 10.

The marker recognition apparatus 20 according to the first exemplary embodiment includes an image acquisition unit 21 that acquires an image of a marker (marker image), an area recognition unit 22 that recognizes each area of the marker image, a color information calculation unit 23 that calculates color frequency information, and a code information calculation unit 24 that calculates the code information of the marker.

The image acquisition unit 21 is a specific example of the image acquisition means. The image acquisition unit 21 shoots a marker by using a camera 211 and acquires its marker image. The image acquisition unit 21 outputs the acquired marker image to the area recognition unit 22.

The area recognition unit 22 is a specific example of the recognition means. The area recognition unit 22 recognizes each area of the marker image output from the image acquisition unit 21. For example, the area recognition unit 22 detects boundaries between the areas 1 to 4 having a concentric circular shape based on the marker image output from the image acquisition unit 21, and thereby recognizes the areas 1 to 4. The area recognition unit 22 outputs the recognized recognition result of each area to the color information calculation unit 23.

The color information calculation unit 23 is a specific example of the color information calculation means. The color information calculation unit 23 calculates color frequency information (color information) X based on the recognition result of each area output from the area recognition unit 22.

For example, the color information calculation unit 23 calculates 16-dimensional data X1 to X16 indicating the component ratio (such as pixel number ratio) of (R), (B), (R/B), (N) and (I) in each of the areas 1 to 4. Next, the color information calculation unit 23 calculates X'1 to X'16 (color frequency information) for which an adjustment to the composition ratio between the areas 1 to 4 has been made. Note that the sizes of the areas 1 to 4 differ from one another. Therefore, for example, the color information calculation unit 23 calculates their respective adjustment values B21 (adjustment between the areas 1 and 2), B32 (adjustment between the areas 2 and 3), and B43 (adjustment between the areas 3 and 4). Then, the color information calculation unit 23 calculates X'1 to X'16 based on these adjustment values B21, B32 and B43. For example, the 13th dimension data corresponds to (I) in the area 3 and corresponds to (R) in the area 4. The adjustment value B43 can be calculated by Expression "B43=(P3−(X9+X10+X11+X12))/X13". Meanwhile, if the value of the corresponding 13th dimension data is zero, there is no color. Therefore, the above-described associating cannot be made. In such a case, the adjustment value B43 is calculated by Expression "B43=P3/(X13+ X14+X15+X16)" by using the number of color frequency information and the size ratio. The adjustment values B21 and B32 can be calculated in a similar manner to that for the above-described adjustment value B43.

The color information calculation unit 23 calculates each of the 16-dimensional data X'1 to X'16 (color frequency information X) based on the 16-dimensional data X1 to X16 and the above-described calculated adjustment values B21, B32 and B43 by using the below-shown Expression.

$X'16=X16, X'15=X15, X'14=X14, X'13=X13,$
$X'12=X12*(1/B43), X'11=X11*(1/B43),$
$X'10=X10*(1/B43), X'9=X9*(1/B43), X'8=X8*$
$(1/(B43*B32)), X'7=X7*(1/(B43*B32)),$
$X'6=X6*(1/(B43*B32)), X'5=X5*(1/(B43*B32)),$
$X'4=X4*(1/(B43*B32*B21)), X'3=X3*(1/$
$(B43*B32*B21)), X'2=X2*(1/(B43*B32*B21)),$
$X'1=X1*(1/(B43*B32*B21))$

The color information calculation unit 23 outputs the above-described calculated color frequency information X to the code information calculation unit 24.

The code information calculation unit 24 is a specific example of the color information calculation means. The code information calculation unit 24 calculates the code information S of the marker by multiplying the color frequency information X output from the color information calculation unit 23 by a transposed matrix (detection matrix) $W^T$ of the M-sequence matrix. For example, the code information calculation unit 24 calculates the code information S of the marker based on the color frequency information X output from the color information calculation unit 23 by using the below-shown Expression (3).

$$S=W^TX \qquad (3)$$

Here, if $S_i$ (i-th dimension value of S) is equal to or higher than a threshold, the i-th bit is set to one. If not so, the i-th bit is set to zero. In this way, n-bit code information (e.g., 16-bit code information) can be expressed.

Figure 8:
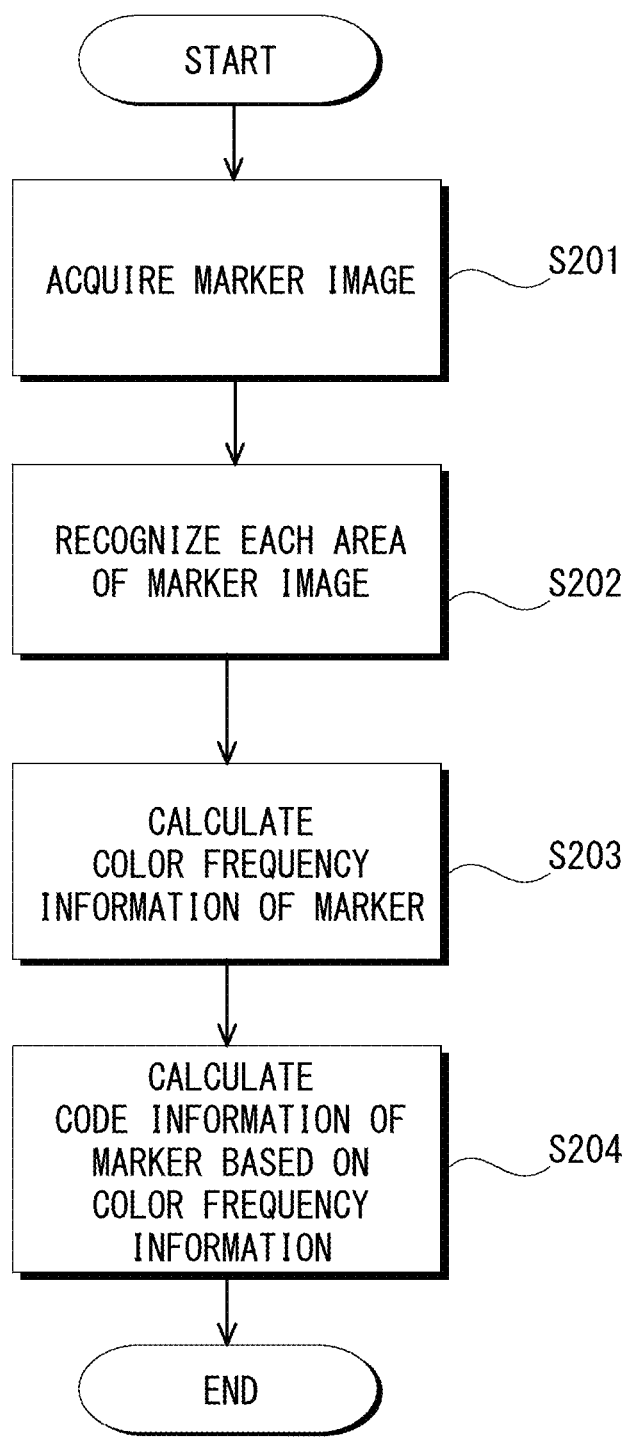
FIG. 8 is a flowchart showing a marker recognition method according to the first exemplary embodiment of the present invention.

FIG. 8 is a flowchart showing the marker recognition method according to the first exemplary embodiment. The image acquisition unit 21 of the marker recognition apparatus 20 shoots a marker by using the camera 211, acquires its marker image, and outputs the acquired marker image to the area recognition unit 22 (step S201). The area recognition unit 22 recognizes each area of the marker image output from the image acquisition unit 21 and outputs the recognition result to the color information calculation unit 23 (step S202).

The color information calculation unit 23 calculates color frequency information X based on the recognition result of each area output from the area recognition unit 22 and outputs the calculated color frequency information X to the code information calculation unit 24 (step S203). The code information calculation unit 24 calculates the code information S of the marker based on the color frequency information X output from the color information calculation unit 23 by using the above-shown Expression (3) (step S204).

Figure 9:
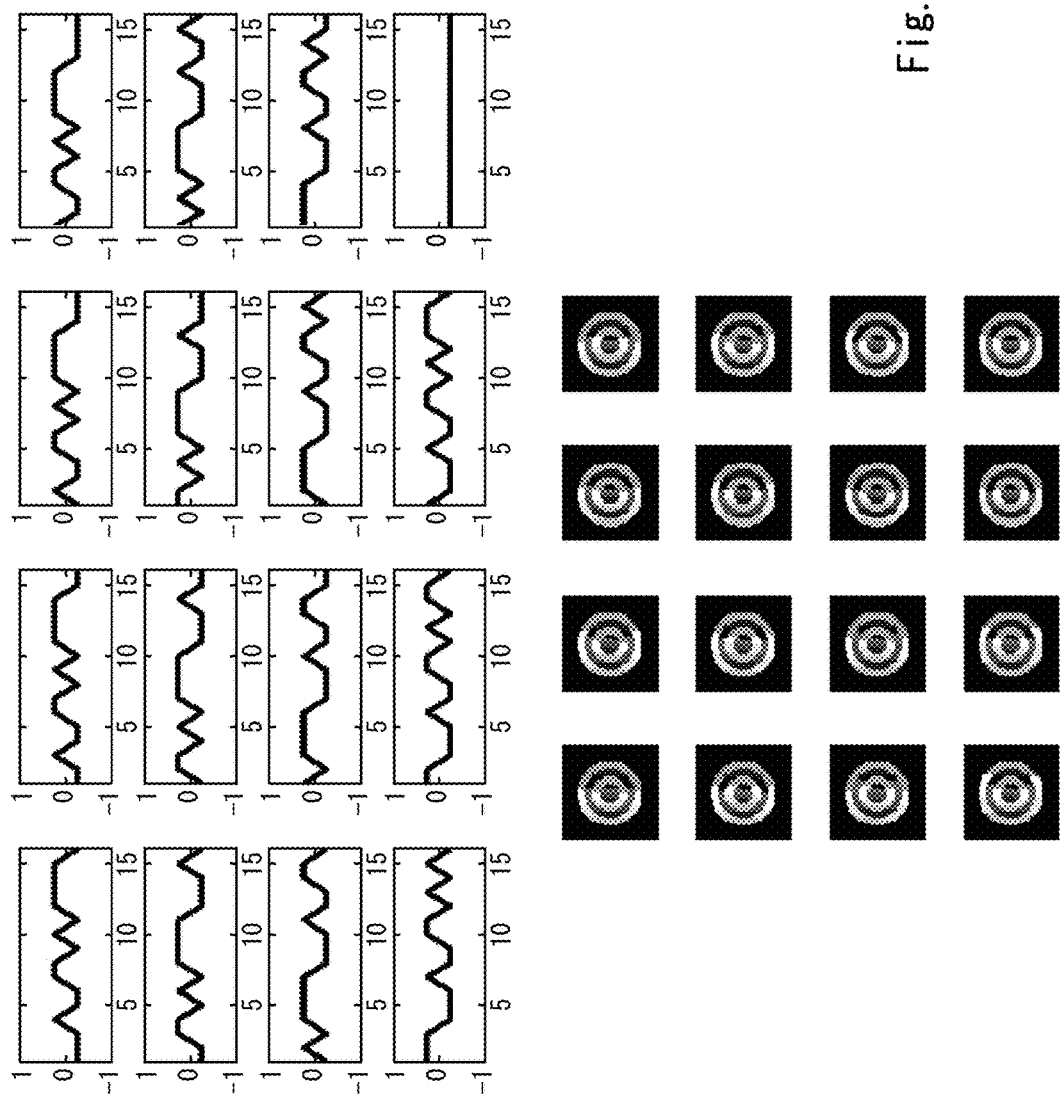
FIG. 9 shows color frequency information values each corresponding to a respective one of bits of code information and their marker images.

Next, whether or not the above-described marker recognition apparatus could recognize code information of a marker generated by the above-described marker generation apparatus was evaluated. FIG. 9 shows values of color frequency information $X_i$ each corresponding to a respective bit of code information and their marker images. Note that each of the color frequency information $X_i$ is an M-sequence itself (upper part in FIG. 9).

Figure 10:
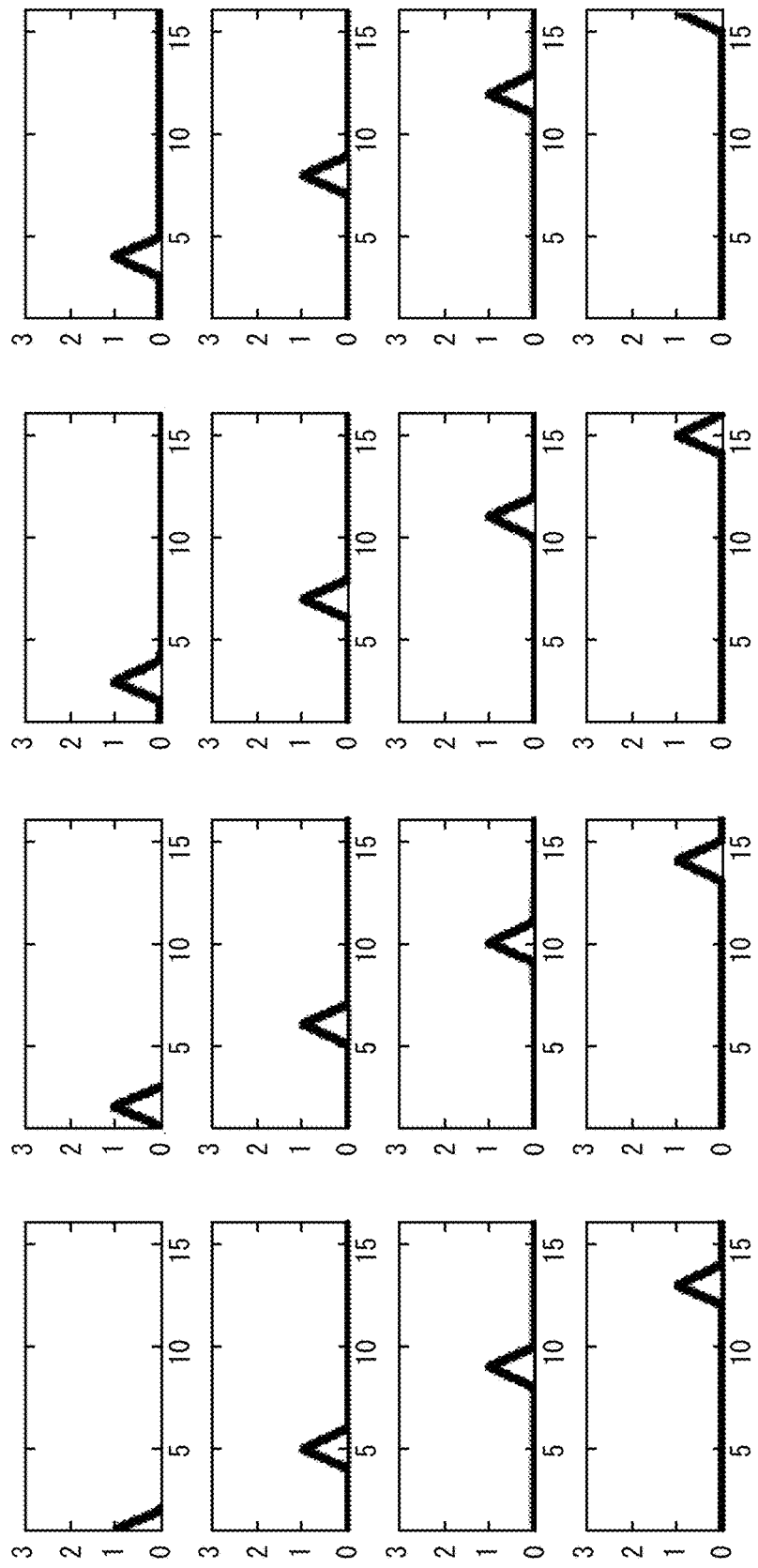
FIG. 10 shows results of code information recognized by a marker recognition apparatus.

FIG. 10 shows results of a series of processes in which: a marker image is read; intermediate code is extracted from color frequency information; and code information is recognized by the marker recognition apparatus. As shown in FIG. 10, it can be understood that corresponding bits are correctly set (set to one) in every data.

Figure 11A:
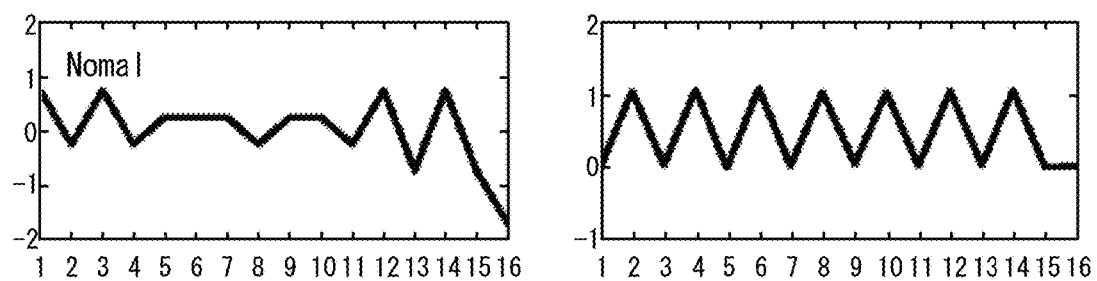
FIG. 11A shows graphs showing an output result when an even bit value is one.

FIG. 11A shows graphs showing a result when the values of the even bits, i.e., 2nd, 4the, 6th, 8th, 10th, 12th and 14th bits are set to one. Note that in each of FIGS. 11A to 11C, the left graph shows color frequency information X and the right graph shows the correlation value output result S ($=W^TX$). As shown in the right graph of FIG. 11A, it can be confirmed that the aforementioned even bits are correctly set and code information can be expressed. That is, it can be confirmed that one bit is expressed by the whole marker image and the code information can be embedded in the marker.

Figure 11B:
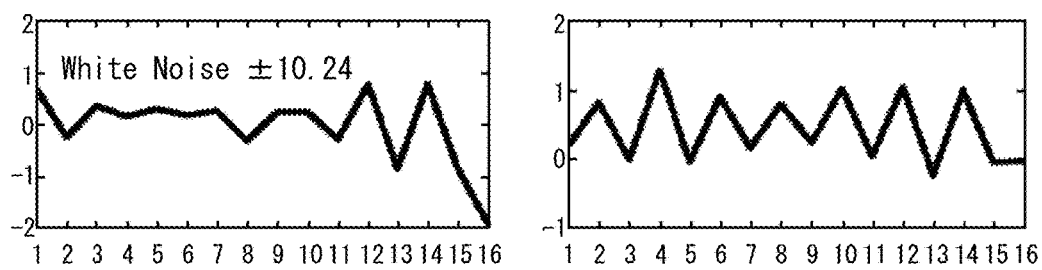
FIG. 11B shows graphs showing an output result when an even bit value is one.
Figure 11C:
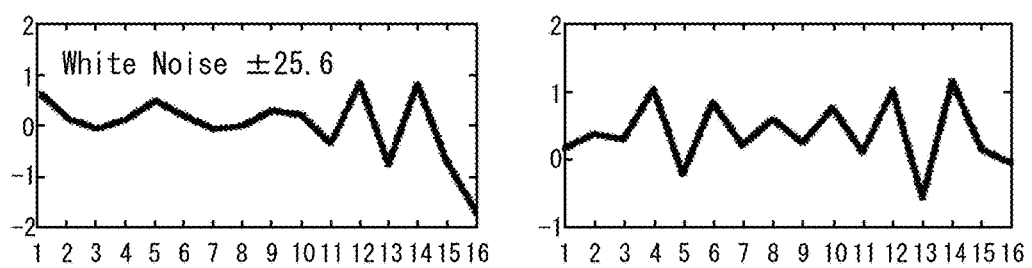
FIG. 11C shows graphs showing an output result when an even bit value is one.

Next, an experiment for examining the tolerance to noises was conducted. FIGS. 11(B) and 11(C) show recognition results when white noises are added in the marker image. In the experiment, uniform random numbers are generated for errors. The errors are changed by ±10.24 by the RGB value in FIG. 11(B), and they are changed by ±25.6 by the RGB value in FIG. 11(C). As a result, in the case of FIG. 11(B), the aforementioned even bits are correctly set. That is, it can be confirmed that the marker recognition apparatus 20 can correctly recognize the code information.

Second Exemplary Embodiment

Figure 12:
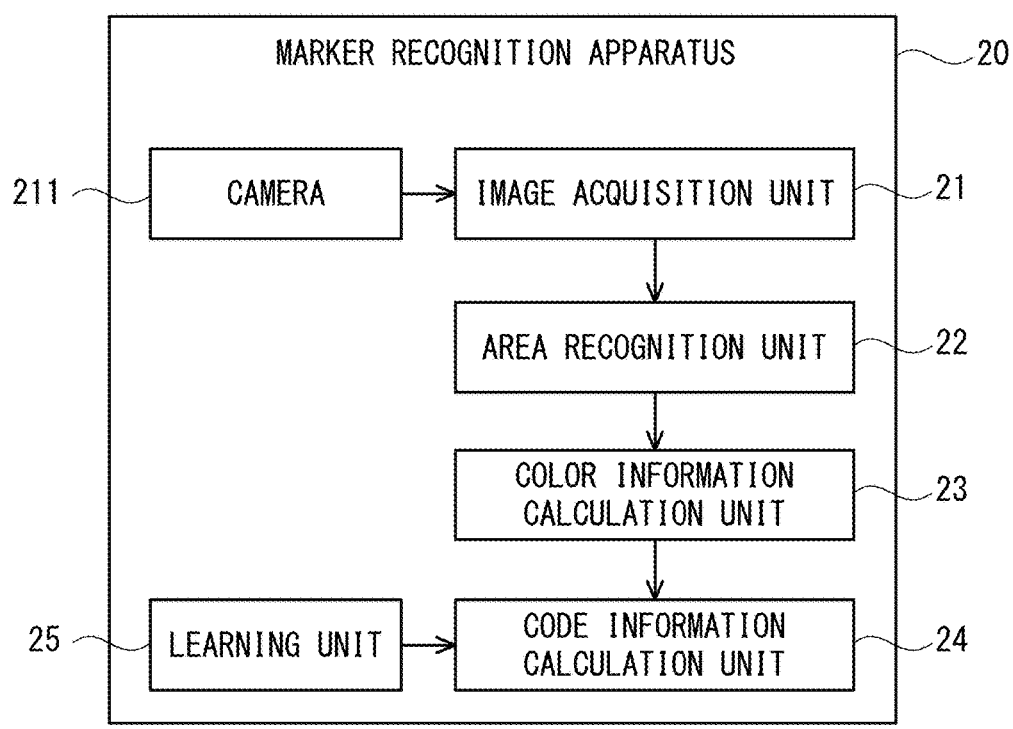
FIG. 12 is a block diagram showing a general system configuration of a marker recognition apparatus according to a second exemplary embodiment of the present invention.

A marker recognition apparatus 30 according to a second exemplary embodiment of the present invention includes, in addition to the above-described configuration, a learning section 25 that learns a transposed matrix $W^T$ (hereinafter called a "detection matrix W") of the M-sequence matrix by an ICA (Independent Component Analysis) by using a marker image containing a noise (FIG. 12). The learning section 25 is a specific example of the learning means. The learning section 25 generates, for example, a plurality of (out-of-focus) marker images containing noises by rotating the marker image or superimposing a Gaussian function (σ) on the marker image.

Out-of-focus blurring could occur in the marker image depending the distance to the marker and/or the position of the marker. To cope with this, the marker recognition apparatus 30 according to the second exemplary embodiment learns a detection matrix W by the ICA by using out-of-focus marker images. This can improve the detection accuracy by the detection matrix W.

The ICA automatically extracts only the component that is independent of the input data. For example, by using Super Gaussian distribution as the probability density function set for the ICA, the detection matrix W can be learned in such a manner that one value of the output data becomes higher and the other values become lower.

Figure 13:
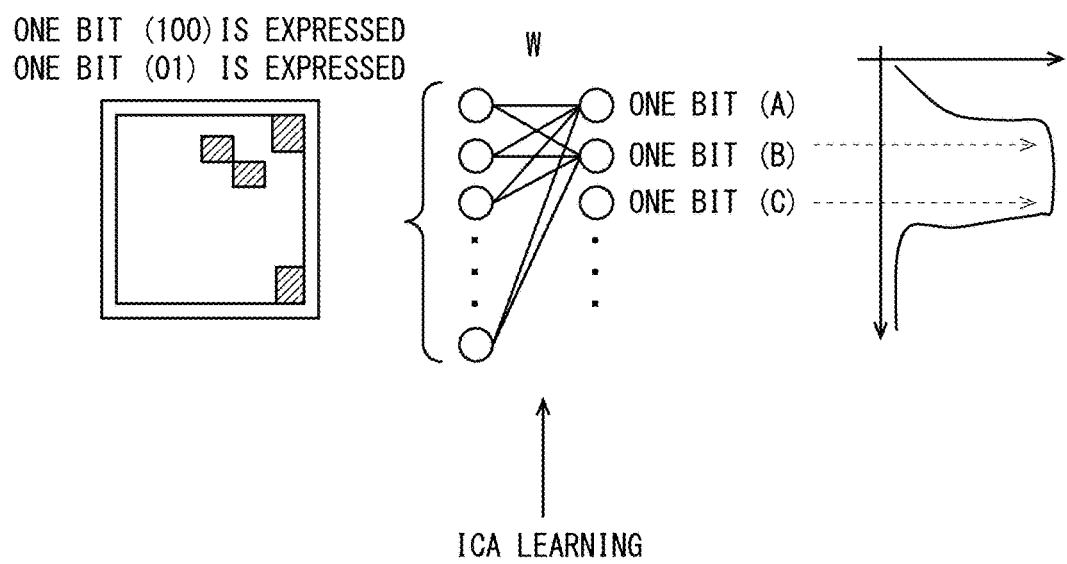
FIG. 13 shows figures for explaining a detection matrix after ICA learning.

In the second exemplary embodiment, each bit value is expressed by a feature pattern of the whole marker image. Then, the feature pattern of the whole marker image is learned by the ICA. This makes it possible to generate a detection matrix W (mapping) so that only the corresponding code outputs a value even when the input data contains noises. For example, as shown in FIG. 13, in the detection matrix W, when the number of components of the input data is equal to or greater than a certain number, the values of the corresponding bits ((B) and (C)) are output as high values and the value of the non-corresponding bit (A) is output as a low value even when the input data contains noises (a defective pixel or the like). As described above, the learning section 25 generates the detection matrix W that is robust against noise images.

Note that it is possible to generate a linear or nonlinear detection matrix (mapping) by using other learning devices (such as an SVM and a neural network). However, their detection matrixes are not ones in which separation is performed in a state where each bit is superimposed (a state where features corresponding to respective bits are mixed). In contrast to this, according to the second exemplary embodiment, each bit value is expressed by a feature pattern of the whole marker image. This enables the leaning of a detection matrix by the ICA. Further, in the second exemplary embodiment, the use of the ICA for the detection matrix enables the detection of the presence/absence of components of a feature pattern corresponding to each bit. This is because the components of a feature pattern corresponding to each bit are learned as independent components. Therefore, it is possible to detect the presence/absence of components of a feature pattern corresponding to each bit even in the state where each bit is superimposed.

Figure 14:
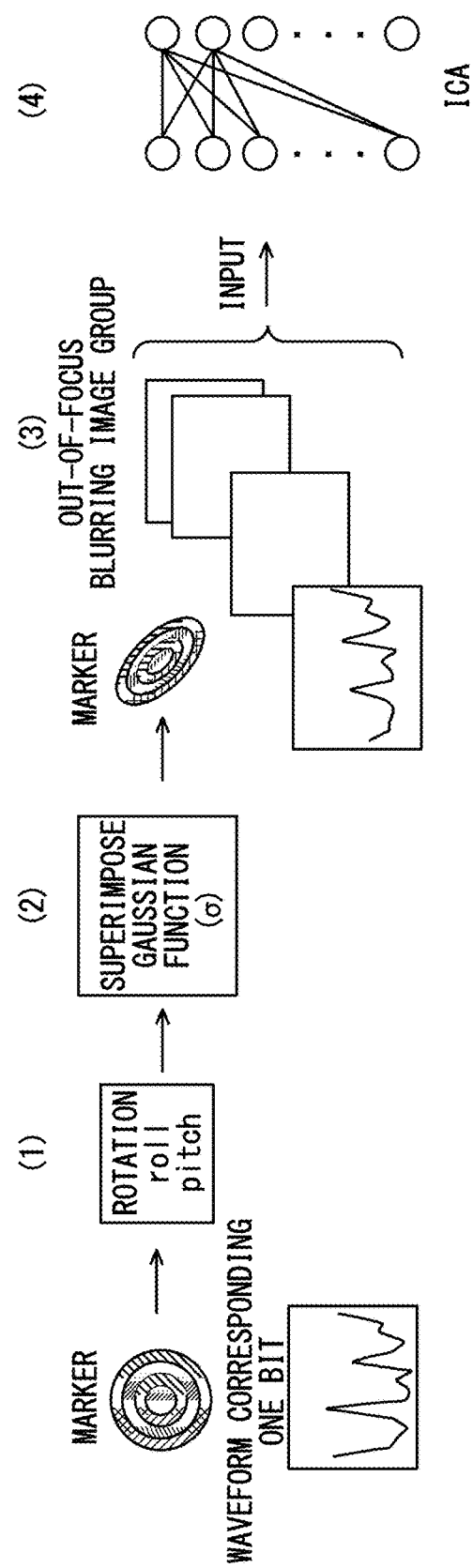
FIG. 14 shows figures for explaining a method for learning a detection matrix W by an ICA.

Next, a method for learning a detection matrix by the ICA is explained in detail with reference to FIG. 14. The learning section 25 generates a group of out-of-focus marker images (3) by, for example, rotating a marker image acquired by the image acquisition unit 21 in a roll direction, a pitch direction, and yaw direction (1) (Note that the rotation in the yaw direction can be omitted). Alternatively, the learning section 25 generates a group of out-of-focus marker images (3) by superimposing a Gaussian function on each of marker images acquired by the image acquisition unit 21 (2). Note that the learning section 25 may generate a group of out-of-focus marker images (3) by rotating a marker image (1) and then superimposing a Gaussian function on each of the rotated marker images (2). Further, the learning section 25 may generate a group of resolution-blurred images by performing down-sampling. Then, the learning section 25 learns a detection matrix W by the ICA as shown below by using the group of out-of-focus images (or the group of resolution-blurred images) (4). In the following explanation, P represents an initial value of a weighting matrix.

The learning section 25 assumes that the probability density function of S is Super Gaussian distribution and performs the ICA by a natural gradient method so that the mutual information amount is minimized.

The update formula of the ICA is given by the below-shown Expressions (4) to (6). In the expressions, ε is 0.1 and I represents a unit matrix.

[Expression 2]

$$B \leftarrow B + \epsilon \Delta B \qquad (4)$$

$$\Delta B = \{(I + E[\phi(S)S^T])B^T\}^T \qquad (5)$$

$$\phi(s) = -\tan h(s) \qquad (6)$$

The code information calculation unit 24 calculates code information S by multiplying the color frequency information X output from the color information calculation unit 23 by the detection matrix $B^T$ learned by the learning section 25 by using the below-shown Expression (7). Note that the color information calculation unit 23 calculates the color frequency information X by using the below-shown Expression (8).

[Expression 3]

$$S = B^T X \qquad (7)$$

$$X = \Sigma_i^n X_i = \Sigma_i^n B_i S_i \qquad (8)$$

Note that in the marker recognition apparatus 30 according to the second exemplary embodiment, the same symbols as those for the marker recognition apparatus 20 according to the above-described first exemplary embodiment are assigned to the same components/structures as those of the marker recognition apparatus 20.

Figure 15:
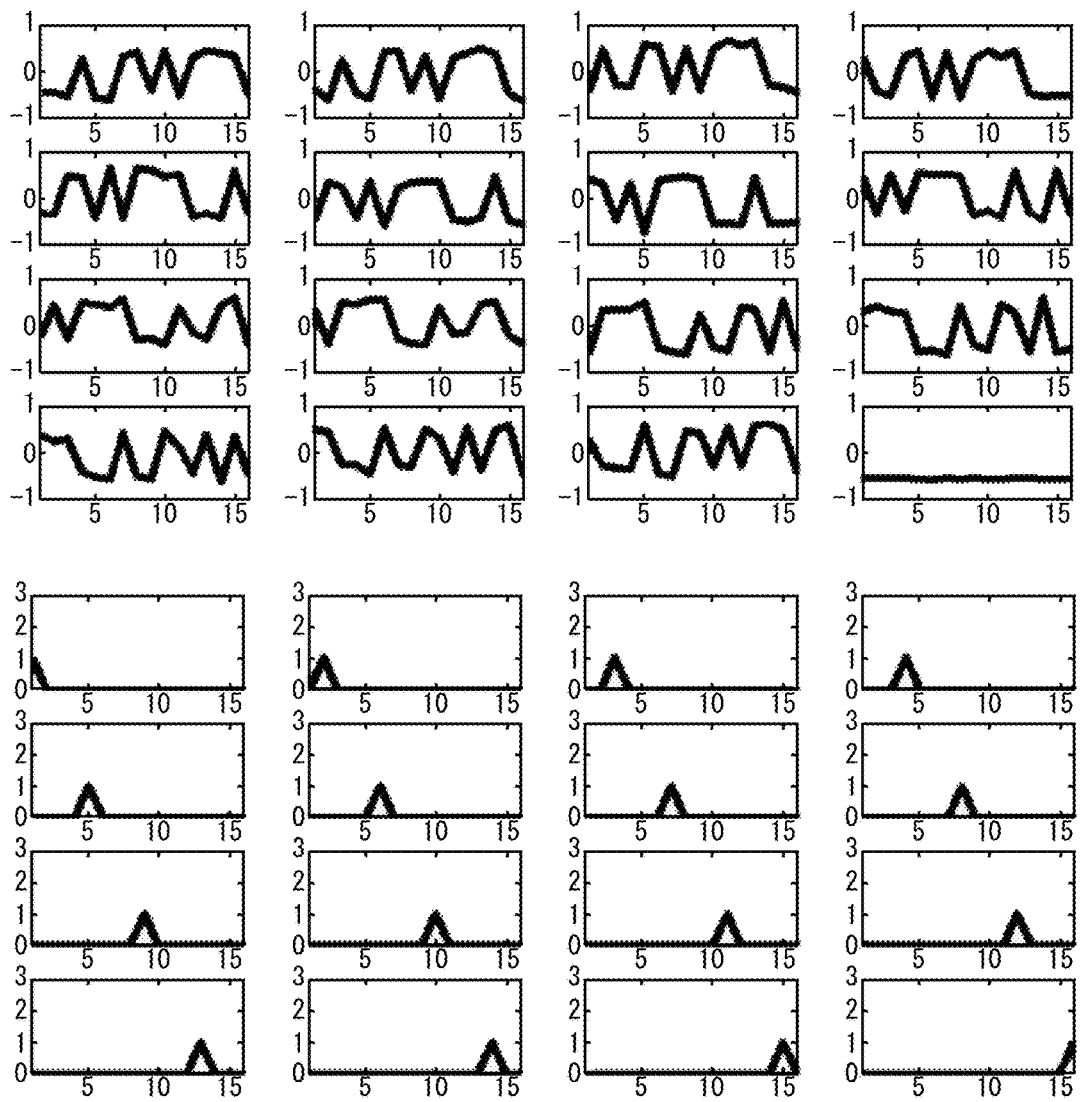
FIG. 15 shows learning results by an out-of-focus blurring image group.

Next, an experiment for evaluating the robustness against out-of-focus blurring was conducted to verify the above-described blurring leaning effect by using the ICA. An intermediate code pattern (color frequency information X) of each bit is learned by using a group of out-of-focus marker images (rotations and blurring). For each bit, below-shown 900 marker images are created as learning data. The learning was conducted by using 14,400 types of marker images in total for all of 16 bits. In this experiment, the number of iterations for the learning was 10,000. FIG. 15 shows learning results obtained by using the out-of-focus blurring image group. In FIG. 15, the upper part shows a matrix B after the learning (hereinafter expressed as the "post-learning matrix B") and the lower part shows code recognition results (outputs of the code information calculation unit 24) corresponding to the respective bits.

As shown in the upper part of FIG. 15, the post-learning matrix B is deformed by the learning, though maintaining the form of the M-sequence matrix shown in the upper part of FIG. 9. As shown in the lower part of FIG. 15, it can be confirmed that each bit can be correctly recognized by using the post-learning matrix B.

Next, the effect of the out-of-focus blurring learning is examined by using the below-shown input image pattern.

[Input Image Pattern to ICA]
    Roll: 0 to 20 degrees at interval of 5 degrees, five patterns
    Pitch: 0 to 20 degrees at interval of 5 degrees, five patterns
    Yaw: 0 to 360 degrees at interval of 30 degrees, 12 patterns
    Gaussian: three patterns of 0, 1.0, and 2.0

Figure 16:
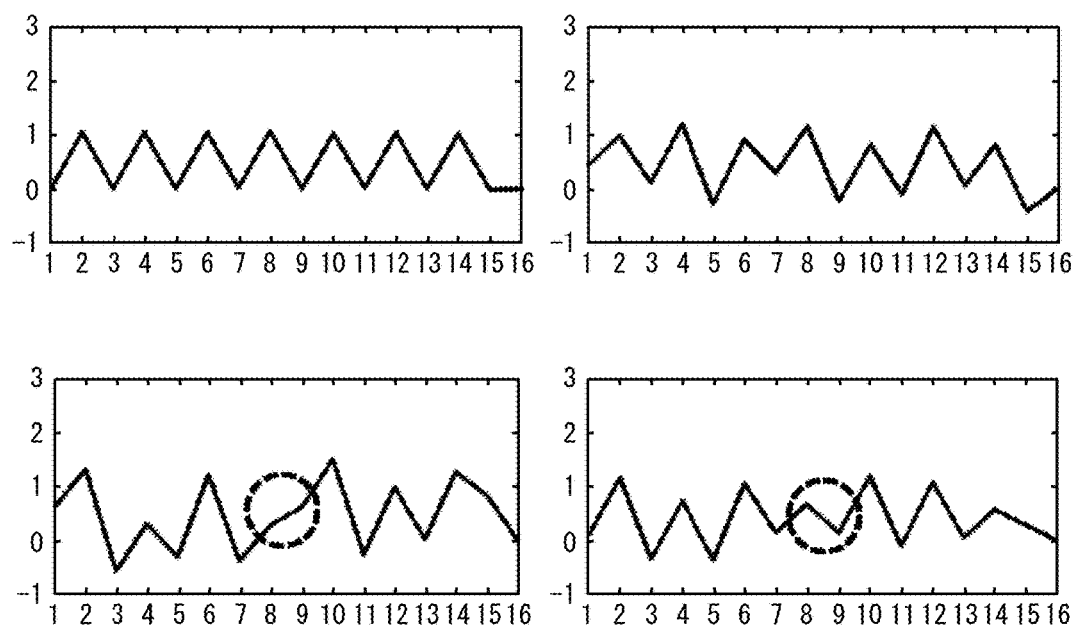
FIG. 16 shows results obtained by evaluations of 900 test data by using input image patterns.

Here, the effect is examined by using a marker in which even bits 2, 4, 6, 8, 10, 12 and 14 are simultaneously set. FIG. 16 shows results obtained by evaluations of 900 test data by using the above-described input image patterns. The upper-left graph of FIG. 16 shows an output result from the code information calculation unit in a case where {there is no out-of-focus blurring, and ICA learning is not performed} and the upper-right graph of FIG. 16 shows an output result in a case where {there is no out-of-focus blurring, and ICA learning is performed}. As shown in the upper-left and upper right graphs of FIG. 16, it can be understood that the bits are correctly recognized in both cases.

Meanwhile, the lower-left graph of FIG. 16 shows an output result from the code information calculation unit in a case where {there is out-of-focus blurring, and ICA learning is not performed} and the lower-right graph of FIG. 16 shows an output result in a case where {there is out-of-focus blurring, and ICA learning is performed}. In the lower-left case, the recognitions of eighth and ninth bits are failed. However, in the lower-right case, it has been seen that the recognitions of eighth and ninth bits are succeeded (broken line in the figure). In the case of performing no ICA learning, the test data is correctly recognized 630 times out of 900 types of test data. In contrast to this, the ICA learning can increase the correct recognition to 748 times (increase in success rate by 13%). Based on the above-described experiment results, it can be understood that the learning of the detection matrix by the ICA by using marker images containing noises improve the accuracy of recognition of the marker code information.

Note that the present invention is not limited to the above-described exemplary embodiments, and various modifications can be made without departing the spirit and scope of the present invention.

For example, although the marker recognition apparatus 30 includes the learning section 25 and learns detection matrixes by the ICA in the above-described exemplary embodiment, the present invention is not limited to such a configuration. The marker generation apparatus 10 may further include a learning unit and learn generator matrixes by the ICA. Alternatively, the marker generation apparatus 10 may calculate a transposed matrix of the detection matrix, for which learning is already performed, in the marker recognition apparatus 30 and use the transposed matrix as the generator matrix.

In the above-described exemplary embodiment, although the color information calculation unit 13 calculates color frequency information (a ratio among predetermined colors), which is used for performing a color arrangement for each area of the marker, by adding up multiplication results obtained by the autocorrelation unit 12, the present invention is not limited to such a configuration. The color information calculation unit 13 may calculate brightness information of predetermined colors (the level of each component) such as a red component and a blue component used for the color arrangement for each area of the marker by adding up multiplication results obtained by the autocorrelation unit 12. The color arrangement unit 14 performs a color arrangement for each area of the marker based on the brightness information calculated by the color information calculation unit 13.

Further, the color information calculation unit 13 may calculate binary information for white and black for the color arrangement for each area of the marker by adding up multiplication results obtained by the autocorrelation unit 12. The color arrangement unit 14 performs a color arrangement for each area of the marker based on the binary information calculated by the color information calculation unit 13.

Although the marker has a circular shape in the above-described exemplary embodiment, the shape of the marker is not limited to the circular shape. The marker may have a polygonal shape such as a square shape, or have an axial symmetry or a point symmetry shape.

Further, in the present invention, the processes shown in FIGS. 6 and 8, for example, can be implemented by causing a CPU to execute a computer program.

The program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)).

Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A marker generation apparatus comprising:
a processor configured to act as:
a code acquisition unit configured to acquire N-bit code information (N is a natural number no less than two) for superimposing the code information on a marker defined in a plurality of areas;
a multiplication unit configured to multiply each bit value of the code information acquired by the code acquisition means by an M-sequence matrix respectively;
a color information calculation unit configured to calculate color information by adding up multiplication results obtained by the processor acting as the multiplication unit, the color information being used for performing a color arrangement for each area of the marker; and
a color arrangement unit configured to perform a color arrangement for each area of the marker based on the color information calculated by the processor acting as the color information calculation unit.

2. The marker generation apparatus according to claim 1, wherein the color information is information indicating a ratio among a plurality of predetermined colors for arranging each of the plurality of predetermined colors for each area of the marker, the plurality of predetermined colors being defined in advance.

3. The marker generation apparatus according to claim 2, wherein the processor acting as the color arrangement unit performs the color arrangement by assigning color information calculated by the processor acting as the color information calculation unit to each area of the marker, respectively, and using the assigned information as a size ratio among the predetermined colors when the predetermined color is arranged for each area of the marker.

4. The marker generation apparatus according to claim 1, wherein the marker has a concentric circular shape and each area of the marker is defined by a concentric circular boundary.

5. The marker generation apparatus according to claim 1, wherein the processor is further configured to act as a learning unit configured to learn the M-sequence matrix by an ICA (Independent Component Analysis) by using a marker image containing a noise, wherein the processor acting as the multiplication unit multiplies each bit value of the code information acquired by the code acquisition means by an M-sequence matrix, respectively, learned by the learning means.

6. A marker recognition apparatus that recognizes code information of a marker generated by a marker generation apparatus according to claim 1.

7. The marker recognition apparatus according to claim 6, comprising:

the processor acting as an image acquisition unit configured to acquire an image of the marker;

the processor acting as a recognition unit configured to recognize each area of the image of the marker acquired by processor acting as the image acquisition unit;

the processor acting as the color information calculation unit further configured to calculate the color information based on each area recognized by the processor acting as the recognition unit; and the processor acting as a code information calculation unit configured to calculate the code information by multiplying color information calculated by the color information calculation means by a transposed matrix of the M-sequence matrix.

8. The marker recognition apparatus according to claim 7, further comprising the processor acting as a learning unit configured to learn the transposed matrix by an ICA (Independent Component Analysis) by using a marker image containing a noise, wherein the processor acting as the code information calculation unit is further configured to calculate the code information by multiplying the color information calculated by the processor acting as the color information calculation unit by the transposed matrix learned by the processor acting as the learning unit.

9. A marker generation method comprising:

acquiring N-bit code information (N is a natural number no less than two) for superimposing the code information on a marker defined in a plurality of areas;

multiplying each bit value of the acquired code information by an M-sequence matrix respectively;

calculating color information by adding up multiplication results obtained by the multiplication, the color information being used for performing a color arrangement for each area of the marker; and performing a color arrangement for each area of the marker based on the calculated color information.

10. A marker recognition method for recognizing code information of a marker generated by a marker generation method according to claim 9.

11. The marker recognition method according to claim 10, comprising:

acquiring an image of the marker;

recognizing each area of the image of the acquired marker;

calculating the color information based on each of the recognized areas; and calculating the code information by multiplying the calculated color information by a transposed matrix of an M-sequence matrix respectively.

12. A marker generation apparatus comprising:

a processor configured to act as:

a code acquisition unit that acquires N-bit code information (N is a natural number no less than two) for superimposing the code information on a marker defined in a plurality of areas;

a multiplication unit that multiplies each bit value of the code information acquired by the code acquisition unit by an M-sequence matrix respectively;

a color information calculation unit that calculates color information by adding up multiplication results obtained by the multiplication unit, the color information being used for performing a color arrangement for each area of the marker; and a color arrangement unit that performs a color arrangement for each area of the marker based on the color information calculated by the color information calculation unit.

* * * * *